Sept. 9, 1941.              A. C. THOMAS              2,255,134
                            BAIT CONTAINER
                          Filed Dec. 23, 1939

INVENTOR
ARTHUR C. THOMAS
BY
Wheeler, Wheeler & Wheeler
ATTORNEYS.

Patented Sept. 9, 1941

2,255,134

UNITED STATES PATENT OFFICE 2,255,134

BAIT CONTAINER

Arthur C. Thomas, Milwaukee, Wis.

Application December 23, 1939, Serial No. 310,755

3 Claims. (Cl. 43—56)

My invention relates to fish bait containers.

The primary object of the invention is to provide an improved container in which live organisms to be used as fish bait can be kept in a healthy condition for extended periods of time without providing earth in which to keep the bait.

Organisms such as hellgramites, crawfish and most worms thrive in a cool, damp place. Even earth worms will live for substantial periods of time out of their natural element and even without foood supplies, if conditions are otherwise suitable. It is, therefore, a further object of the invention to provide a container in which bait can easily be kept under proper conditions and with a minimum amount of work or attention.

In the drawing.

Like parts are identified by the same reference characters throughout the several views.

Figure 1:
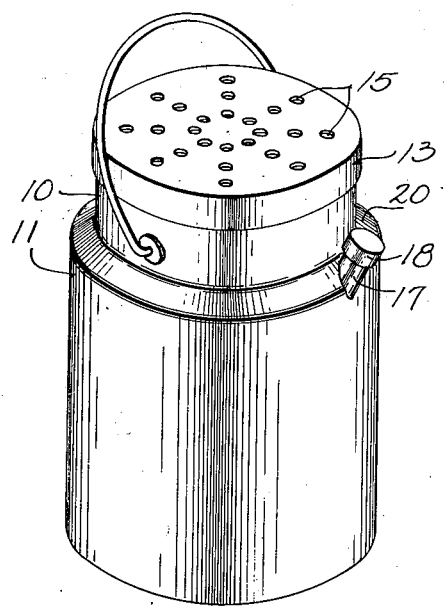
Fig. 1 is a perspective view of the improved bait container.
Figure 2:
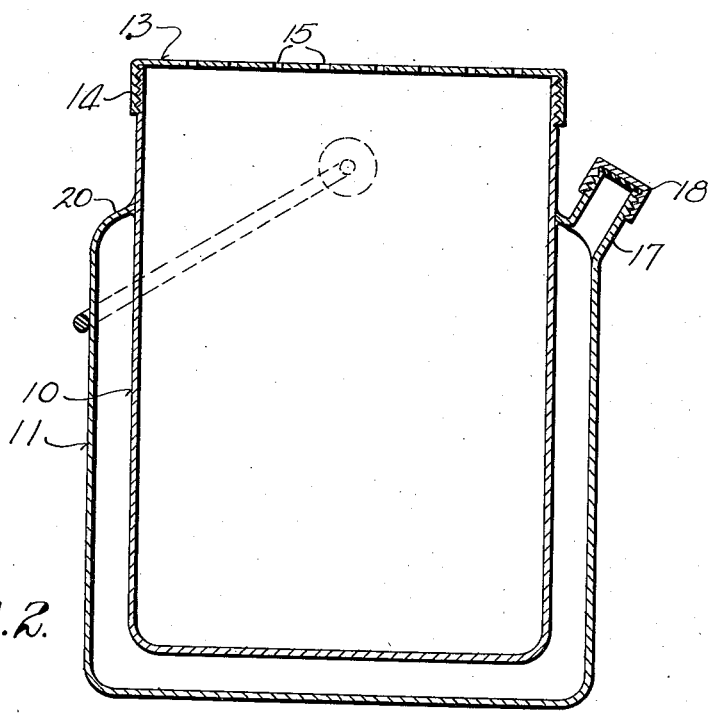
Fig. 2 is a cross sectional view of the container shown in Fig. 1.

As best shown in Fig. 2, I provide a central chamber or can 10, in which the live bait is kept. This container is preferably cylindrical in shape, and is preferably substantially encased within a water-tight jacket 11 although the jacket may, for some purposes, be less extensive or more extensive than that shown. Chamber 10 is of heat conducting material such as sheet metal. Jacket 11 is preferably of heat insulating material, such as a plastic composition or earthenware, but where economy of manufacture is paramount it may be made of sheet metal.

Container 10 has its top provided with a cover 13 removably secured by means of threaded portion 14. Cover 13 is provided with vent apertures 15 to allow communication between the interior of the container and the atmosphere. Jacket 11 is provided with a filling spout 17, having a removable cap 18.

In use, jacket 11 is filled with cold water, thus surrounding a substantial portion of container 10 with a chilling medium. In effect the container with the exception of the portion extending above the upper jacket wall 20, is completely submerged in cold water. The cold water withdraws heat from the interior of the container, causes condensation and precipitation of moisture on the inner surfaces thereof and sets up circulation from the exterior. As moisture-laden atmosphere which is free to enter the container through apertures 15, enters the container, the condensate will continue to accumulate on the inner wall of the container and upon the skins of the live bait until such time as the water within the jacket rises in temperature to approximately that of the surrounding atmosphere. By periodic removal of the water within the jacket after its temperature has risen and the substitution therefor of cold water, the interior of jacket 11 and its contents can be kept continuously moist and cool.

If desired, a shallow body of moist earth or of any suitable moist material or food supply may be placed in the container, but it should be of insufficient depth to exclude air from contact with the cool metal walls. The container 10 may be left entirely empty except for the live bait contained therein, unless such bait is to be fed or kept therein for an extraordinary length of time. With a food supply, the bait may be allowed to grow and fatten under the care of a dealer or professional fisherman and cans filled with bait may may be sold as articles of commerce.

I claim:

1. A container provided with an apertured cover and adapted renewably to receive a bait supply of fish worms, grubs or the like, said container being jacketed and provided between the container and jacket walls with a supply of liquid coolant, whereby moisture laden atmospheric air may enter the container through the cover apertures and contact the interior surfaces of the cooled walls thereof, to cause the moisture from the air to be condensed upon said surfaces to provide a cool and damp condition within the container conducive to bait life.

2. A fish bait container comprising an inner receptacle having vent means for restricted circulation of atmospheric air, said receptacle having an exterior wall provided externally with chilling means, whereby to lower the temperature of said wall sufficiently to condense moisture thereon from the air circulating into and from said container to establish cool and moist conditions therein.

3. A fish bait container comprising an inner receptacle having vent means for restricted circulation of atmospheric air, said receptacle having an exterior wall provided externally with chilling means, whereby to lower the temperature of said wall sufficiently to condense moisture thereon from the air circulating into and from said container to establish cool and moist conditions therein, said chilling means comprising a jacket about the wall portions of said container and provided with a filler opening and a closure for retaining in the jacket and about said wall portions coolant introduced therein.

ARTHUR C. THOMAS.